(12) United States Patent
Tanaka

(10) Patent No.: US 9,367,272 B2
(45) Date of Patent: Jun. 14, 2016

(54) IMAGE PROCESSING APPARATUS, AND METHOD FOR CONTROLLING IMAGE PROCESSING APPARATUS

(71) Applicant: CANON KABUSHIKI KAISHA, Tokyo (JP)

(72) Inventor: Hirotomo Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/554,463

(22) Filed: Nov. 26, 2014

(65) Prior Publication Data
US 2015/0153977 A1 Jun. 4, 2015

(30) Foreign Application Priority Data
Dec. 2, 2013 (JP) .................. 2013-249024

(51) Int. Cl.
*G06F 15/00* (2006.01)
*G06F 3/12* (2006.01)
*G06F 1/32* (2006.01)
*G06K 15/00* (2006.01)

(52) U.S. Cl.
CPC ........... *G06F 3/1229* (2013.01); *G06F 1/3284* (2013.01); *G06F 1/3287* (2013.01); *G06F 3/1221* (2013.01); *G06F 3/1234* (2013.01); *G06K 15/4055* (2013.01); *Y02B 60/1271* (2013.01)

(58) Field of Classification Search
CPC ............................ G06F 1/3284; G06F 3/1234
USPC ....................................................... 358/1.13
See application file for complete search history.

(56) References Cited

U.S. PATENT DOCUMENTS

2008/0114996 A1* 5/2008 Suzuki ............... G03G 15/5004
713/320
2011/0164895 A1* 7/2011 Ishikake et al. ................. 399/88

FOREIGN PATENT DOCUMENTS

JP 2008-122917 A 5/2008
JP 2010-2500 A 1/2010

* cited by examiner

*Primary Examiner* — Saeid Ebrahimi Dehkord
(74) *Attorney, Agent, or Firm* — Canon USA, Inc. IP Division

(57) ABSTRACT

An image processing apparatus that generates image data from a print job and inputs the image data to an image forming apparatus includes a receiving unit that receives information indicating that the image forming apparatus interrupts printing based on the image data and a control unit that shifts a power state of the image processing apparatus from a first power state to a second power state, in which consumed power is less than that in the first power state, based on the received information.

19 Claims, 11 Drawing Sheets

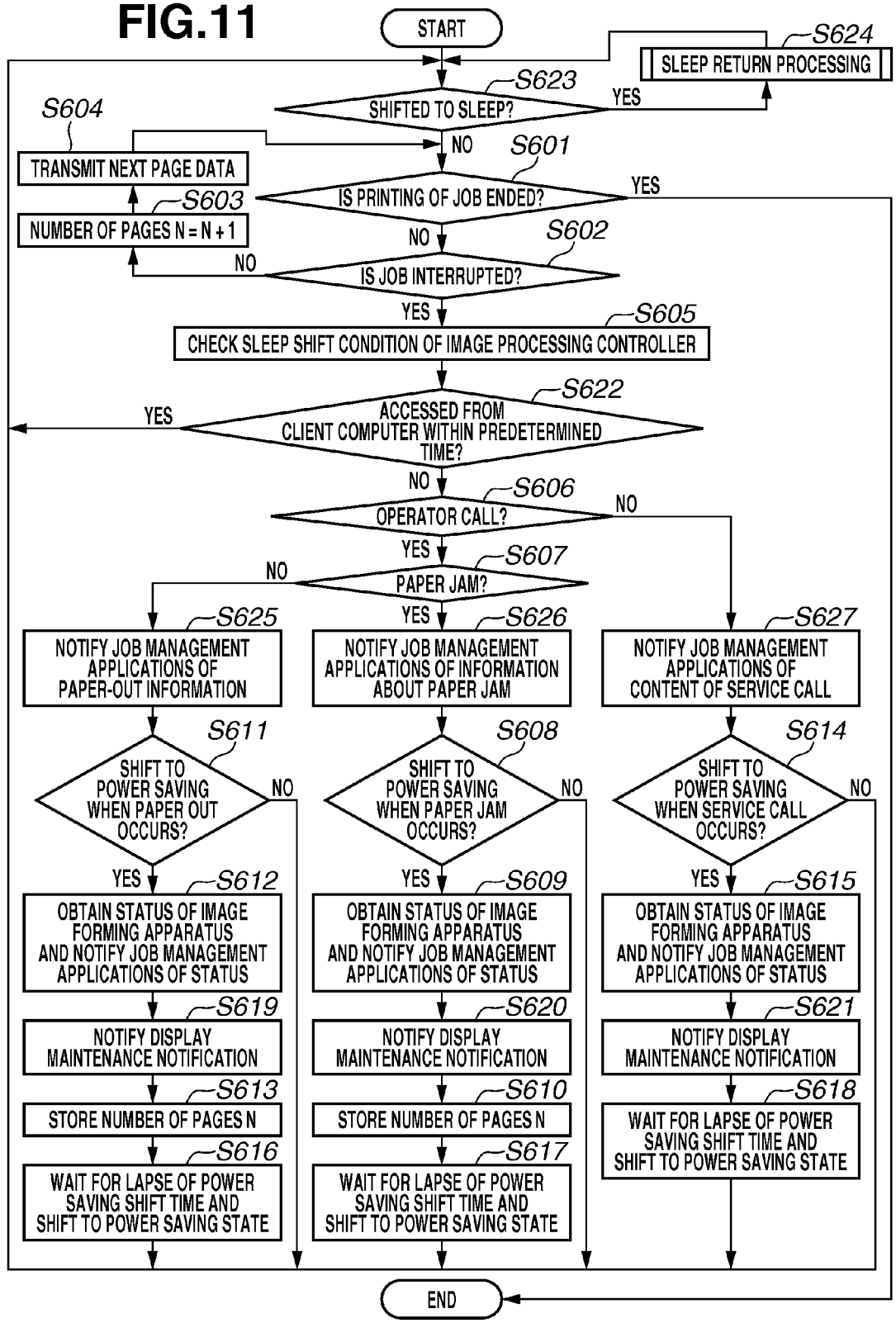

ions apparatus to a power saving state on the condition that the image forming apparatus has not been operated for a certain time (see Japanese Patent Application Laid-Open No. 2010-2500).

IMAGE PROCESSING APPARATUS, AND METHOD FOR CONTROLLING IMAGE PROCESSING APPARATUS

BACKGROUND

1. Field

Aspects of the present invention generally relate to an information processing system in which an image forming apparatus and an image processing controller perform image processing in cooperation with each other.

2. Description of the Related Art

Recently, demand for power saving of apparatuses such as an image forming apparatus has been increasing. There has been discussed a technique for shifting a power state of an image forming apparatus to a power saving state on the condition that the image forming apparatus has not been operated for a certain time (see Japanese Patent Application Laid-Open No. 2010-2500).

Such an image forming apparatus shifts to the power saving state if a certain time has elapsed since the end of print processing by a printer unit or scanner processing by a scanner unit or if a certain time has elapsed since the end of communication with an external apparatus. Furthermore, there has been discussed a technique for shifting the power state of the image forming apparatus to the power saving state if an error is caused in the image forming apparatus (see Japanese Patent Application Laid-Open No. 2008-122917).

In some cases, such an image forming apparatus is connected with an image processing controller that performs image processing in cooperation with the image forming apparatus. The image processing controller connected to the image forming apparatus prepares layout information and image data for outputting a print product from the image forming apparatus. The image processing controller periodically obtains information about the image forming apparatus (e.g., sheet feed stage information, sheet information, and toner information) from the image forming apparatus, and displays the obtained information about the image forming apparatus on a computer or the like of a user using the image forming apparatus. The information to be displayed includes error information about the image forming apparatus. When the image forming apparatus is in the process of recovery from an error, the image processing controller simply obtains the information about the image forming apparatus on a periodic basis without performing layout processing or processing for generating image data.

Even when such an image processing controller is connected to the image forming apparatus, the image forming apparatus needs to shift to the power saving state if a certain time has elapsed since the end of the print processing by the image forming apparatus.

Despite the shift of the image forming apparatus to the power saving state, much consideration has not conventionally been given to the shift of the image processing controller to a power saving state. The image processing controller has been configured to shift to the power saving state upon receiving a job end notification from the image forming apparatus. For example, in a case where the image forming apparatus interrupts printing due to the occurrence of an error, the image processing controller has been unable to shift to the power saving state while the image forming apparatus is in the process of recovery. If the time for recovery is long, the image processing controller therefore remains unchanged without shifting to the power saving state for a long time, failing to achieve power saving.

SUMMARY

Aspects of the present invention are generally directed to a technique for achieving power saving of an image processing controller connected to an image forming apparatus.

According to an aspect of the present invention, an image processing apparatus configured to generate image data from a print job and input the image data to an image forming apparatus, includes a receiving unit configured to receive information indicating that the image forming apparatus interrupts printing based on the image data, and a control unit configured to shift a power state of the image processing apparatus from a first power state to a second power state, in which consumed power is less than that in the first power state, based on the received information.

Further features of the present disclosure will become apparent from the following description of exemplary embodiments with reference to the attached drawings.

BRIEF DESCRIPTION OF THE DRAWINGS

FIG. 11 is a flowchart illustrating a power saving state shift operation of an image processing controller according to a second exemplary embodiment.

DESCRIPTION OF THE EMBODIMENTS

Various exemplary embodiments will be described in detail below with reference to the drawings.

Overall Configuration of Image Forming System

Figure 1:
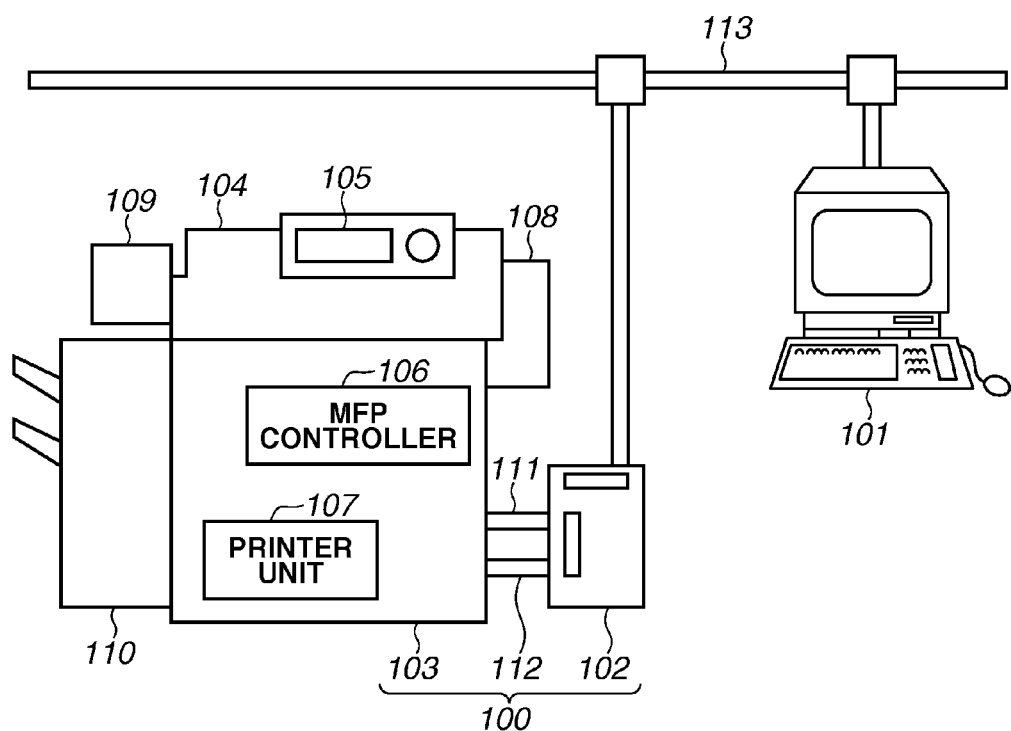
FIG. 1 is an overall configuration diagram of an image forming system, illustrating an exemplary embodiment.

FIG. 1 is a block diagram illustrating an example of an overall configuration of an image forming system according to an exemplary embodiment.

In FIG. 1, an image forming system (information processing system) 100 according to a first exemplary embodiment includes an image processing controller 102 and an image forming apparatus 103. The image forming system 100 is connected to a client computer 101. The client computer 101 and the image processing controller 102 can communicate with each other via a network 113 such as the one based on the Ethernet (registered trademark).

The image processing controller 102 and the image forming apparatus 103 are connected via a control cable 111 and an image video cable 112. In the present exemplary embodiment, the image forming apparatus 103 is not directly connected to the network 113. That is to say, the image forming apparatus 103 and the client computer 101 communicate with each other via the image processing controller 102. The image forming apparatus 103 may be, however, connected to the network 113. In other words, the image forming apparatus 103 may be directly connected to the client computer 101 in a communicable manner.

The client computer 101 activates an application and issues a print instruction or the like to the image forming apparatus 103. The image processing controller 102 performs image processing in cooperation with the image forming apparatus 103. The image processing controller 102 generates image data from a print job received from outside (e.g., the client computer 103) and inputs the image data to the image forming apparatus 103.

Although the image forming apparatus 103 according to the present exemplary embodiment is a multiple function peripheral (MFP), other printers such as a single function peripheral (SFP) may be used. The image forming apparatus 103 performs printing on a sheet, such as paper, based on the image data input from the image processing controller 102.

Configuration of Image Forming Apparatus

Figure 2:
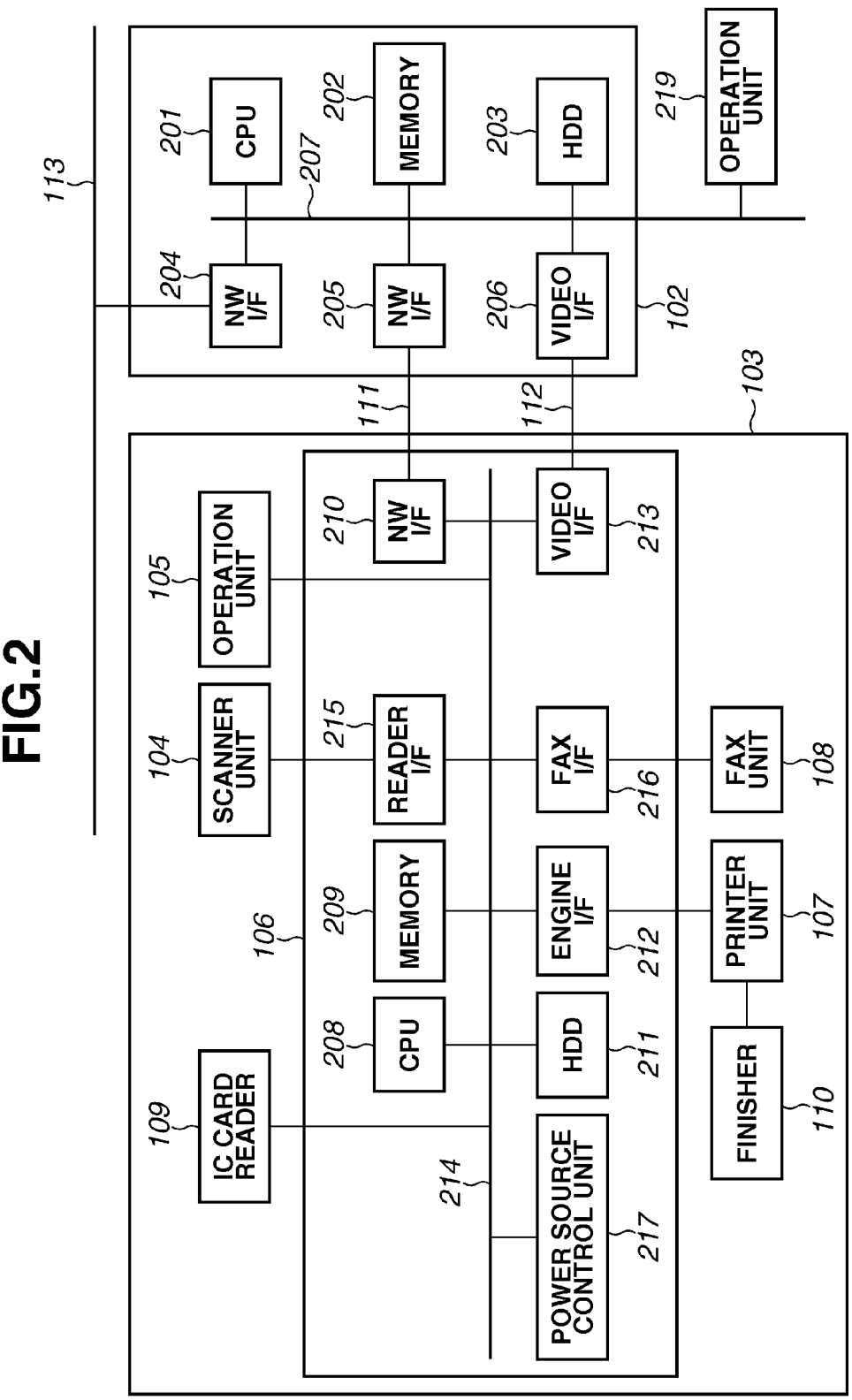
FIG. 2 is a hardware configuration diagram of an image forming apparatus and an image processing controller.

FIG. 2 is a block diagram illustrating an example of a hardware configuration of the image forming apparatus 103 and the image processing controller 102.

The image forming apparatus 103 includes a scanner unit 104, an operation unit 105, an MFP controller 106, a printer unit 107, a fax unit 108, an integrated circuit (IC) card reader 109, and a finisher 110.

The scanner unit 104 reads a document to input image data. The operation unit 105 includes various keys and a panel. The operation unit 105 receives various instructions from a user via the various keys. The operation unit 105 displays various types of information via the panel. The MFP controller 106 controls the scanner unit 104 and the printer unit 107. Details of the MFP controller 106 will be described below.

The printer unit 107 performs printing on a sheet, such as paper, based on image data. The fax unit 108 is connected to a not-illustrated telephone line and performs facsimile input/output processing via the telephone line. The IC card reader 109 reads information from an IC card for identifying the user. The finisher 110 receives the sheet on which an image is formed by the printer unit 107, and performs processing on the received sheet. Examples of the processing include sheet discharging, sorting, stapling, punching, and cutting.

The image forming apparatus 103 having the foregoing configuration can perform the following functions.

[Copy Function]

The copy function is a function of storing the image data of the document read by the scanner unit 104 into a hard disk drive (HDD) 211 in the MFP controller 106, and performing printing on a sheet, by the printer unit 107, based on the image data.

[Send Function]

The send function is a function of sending the image data of the document read by the scanner unit 104 to the client computer 101 via the network 113.

[Box Function]

The box function is a function of storing the image data of the document read by the scanner unit 104 into the HDD 211 of the MFP controller 106 as well as storing image data transmitted from the client computer 101 into the HDD 211.

[Print Function]

The print function is a function of interpreting and printing, by the printer unit 107, page description language (PDL) data transmitted from the client computer 101.

Details of MFP Controller of Image Forming Apparatus

Details of the MFP controller 106 of the image forming apparatus 103 will be described with reference to FIG. 2.

The MFP controller 106 includes a central processing unit (CPU) 208, a memory 209, a network interface (NW I/F) 210, the HDD 211, an engine I/F 212, a video I/F 213, a reader I/F 215, a fax I/F 216, and a power source control unit 217.

The CPU 208 executes programs stored in storage devices (e.g., the memory 209 and the HDD 211) to control the respective units of the image forming apparatus 103 via a system bus 214 and perform calculations. The memory 209 is used as a work memory of the CPU 208. The network I/F 210 transmits and receives control commands to/from the image processing controller 102 via the control cable 111.

The HDD 211 is a mass storage device such as a hard disk. The HDD 211 stores various control programs to be executed by the CPU 208 and image data. Other storage devices such as a solid state drive (SSD) may be used instead of the HDD 211.

The engine I/F 212 transmits and receives control commands to/from the printer unit 107. The video I/F 213 transmits and receives image data to/from the image processing controller 102 via the image video cable 112. The reader I/F 215 transmits and receives control commands to/from the scanner unit 104 and the operation unit 105. The fax I/F 216 is connected to the fax unit 108. The power source control unit 217 controls power supply to the respective units of the image forming apparatus 103.

Details of Image Processing Controller

As illustrated in FIG. 2, the image processing controller 102 includes a CPU 201, a memory 202, an HDD 203, network I/Fs (NW I/Fs) 204 and 205, a video I/F 206, and an operation unit 219.

The CPU 201 executes programs stored in storage devices (e.g., the memory 202 and the HDD 203) to control the respective units of the image processing controller 102 via a system bus 207 and perform calculations. The memory 202 is used as a work memory of the CPU 201.

The HDD 203 is a mass storage device such as a hard disk. The HDD 203 stores various control programs to be executed by the CPU 201 and image data. Other storage devices such as an SSD may be used instead of the HDD 203.

The network I/F 204 communicates with another apparatus such as the client computer 101 via the network 113. The network I/F 205 transmits and receives control commands to/from the image forming apparatus 103 via the control cable 111. The video I/F 206 transmits and receives image data to/from the image forming apparatus 103 via the image video cable 112.

Power Source Circuit Diagram of Image Processing Controller

Figure 3:
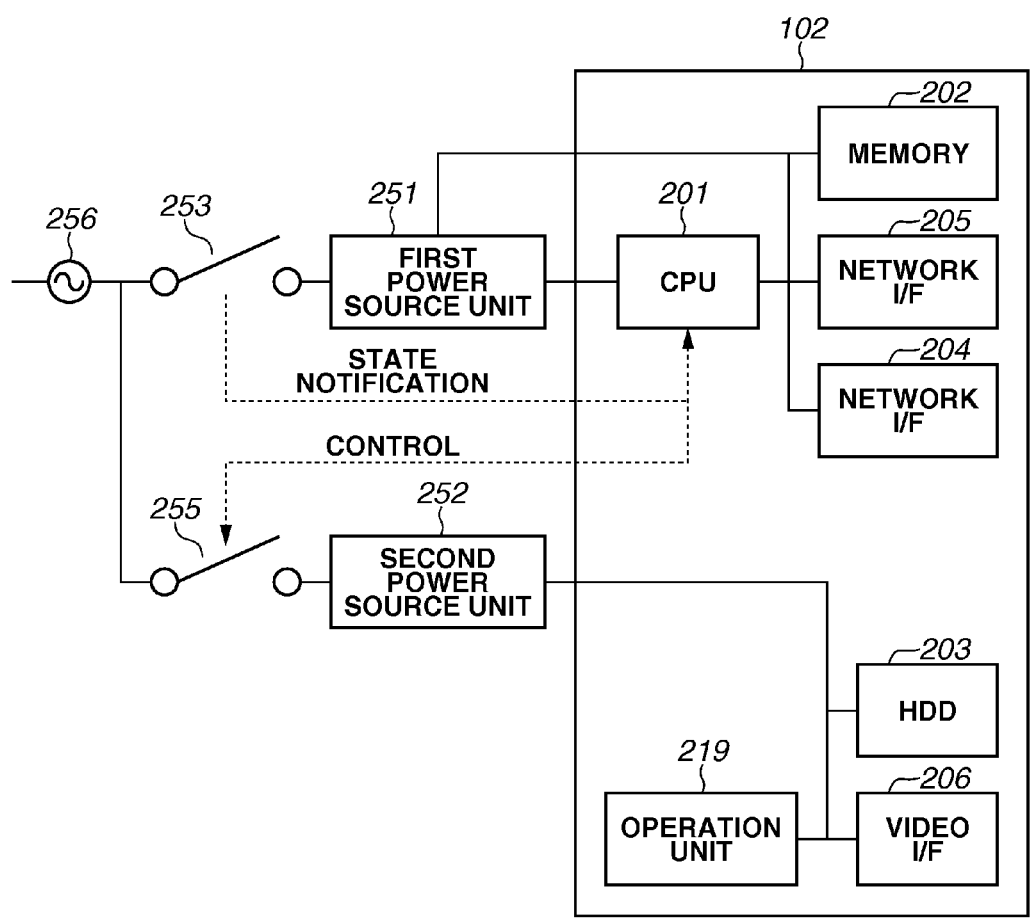
FIG. 3 is a power source circuit diagram of the image processing controller.

FIG. 3 is a diagram schematically illustrating an example of a power source circuit of the image processing controller 102. A power source configuration of the image processing controller 102 will be described below with reference to FIG. 3. The configuration of the power source circuit of the image processing controller 102 is not limited to the configuration illustrated in FIG. 3. Any configuration may be employed as long as the image processing controller 102 can shift to a power saving state. The image processing controller 102 can be implemented by using a personal computer. The power source circuit of the image processing controller 102 may be configured similarly to that of a personal computer.

The image processing controller 102 includes a small-capacity first power source unit 251 and a large-capacity second power source unit 252. The first power source unit 251 converts alternating-current power supplied from an alternating-current (AC) power source 256 into direct-current power (for example, 3.3 V). The direct-current power is supplied to the CPU 201, the memory 202, and the network I/Fs 204 and 205.

The second power source unit 252 converts the alternating-current power supplied from the AC power source 256 into direct-current power (for example, 5 V). The direct-current power is supplied to the HDD 203, the video I/F 206, and the operation unit 219.

Figure 4:
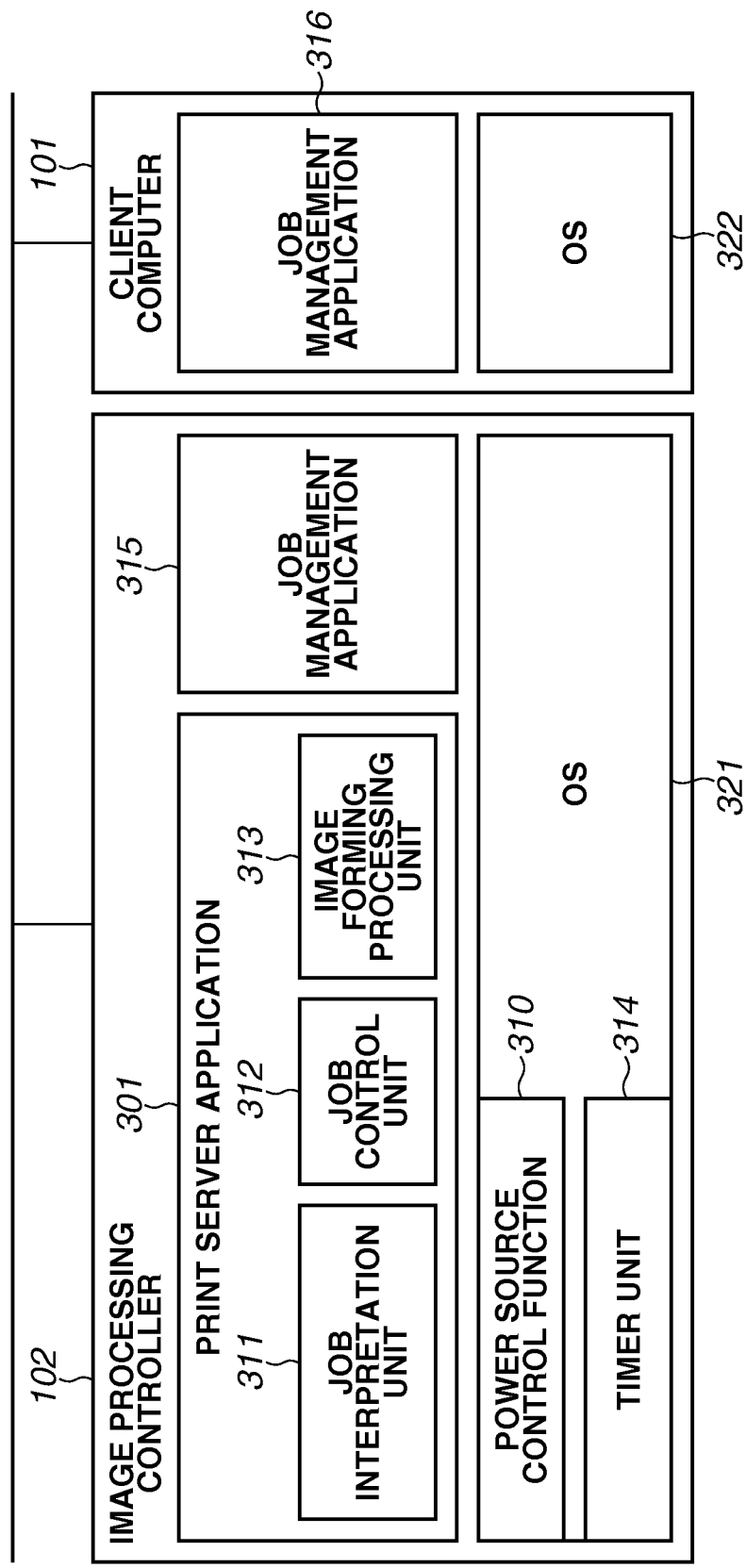
FIG. 4 is a software configuration diagram of the image processing controller.

In the present exemplary embodiment, the power source control of the image processing controller 102 is implemented by the CPU 201 according to a power source control program of a power source control function 310 (FIG. 4) of an operating system (OS) 321 (FIG. 4).

A push switch 253 is provided between the AC power source 256 and the first power source unit 251. A field effect transistor (FET) 255 is provided between the AC power source 256 and the second power source unit 252. The push switch 253 is intended to be pressed by the user.

If the push switch 253 is pressed, the CPU 201 is notified of it. The FET 255 is configured to be switched on or off by control of the CPU 201.

Figure 5:
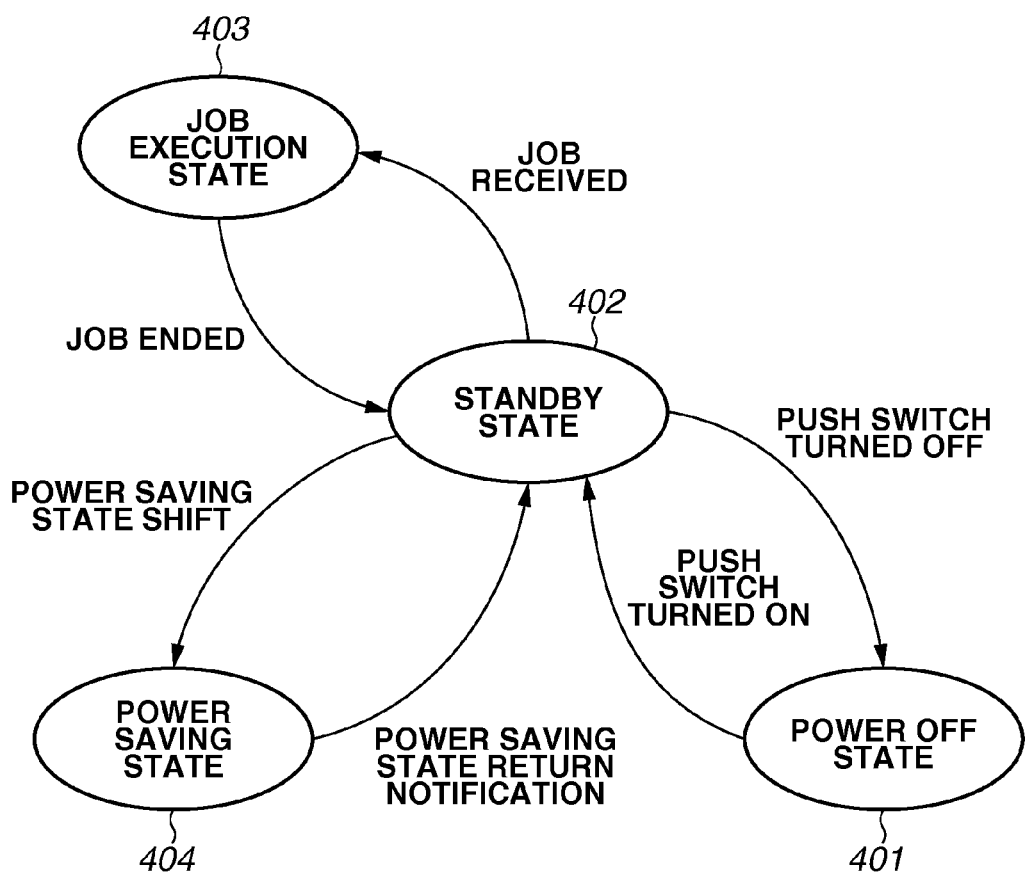
FIG. 5 is a transition diagram of a power state of the image processing controller.

In a power off state 401 (FIG. 5), if the push switch 253 is pressed, power is supplied from the first power source unit 251, and the CPU 201 turns on the FET 255. As a result, power is supplied from the second power source unit 252 to the respective units such as the HDD 203, the video I/F 206, and the operation unit 219, and the image processing controller 102 enters a standby state 402 (FIG. 5).

If a power saving shift condition is satisfied, the CPU 201 turns off the FET 255. As a result, the power supply to the respective units (the HDD 203, the video I/F 206, and the operation unit 219) connected to the second power source unit 252 is stopped and the image processing controller 102 enters a power saving state 404 (FIG. 5). In the power saving state 404, power is supplied to limited units such as the CPU 201, the memory 202, and the network I/Fs 204 and 205 while the power supply to the other units is stopped. In the power saving state 404, the memory 202 may be shifted into a self-refresh mode, or the CPU 201 itself may shift to a low power mode.

In the power saving state 404, if the CPU 201 turns on the FET 255, the power supply to the respective units (the HDD 203, the video I/F 206, and the operation unit 219) connected to the second power source unit 252 is resumed. As a result, the image processing controller 102 returns to the standby state 402 (FIG. 5).

Software Configuration of Image Processing Controller

FIG. 4 is a block diagram illustrating an example of a software configuration of the image processing controller 102.

The software configuration of the image processing controller 102 will be described with reference to FIG. 4. Software blocks 301, 315, and 321 of the image processing controller 102 illustrated in FIG. 4 are implemented by the CPU 201 reading and executing programs stored in the memory 202 or the HDD 203 of the image processing controller 102. Software blocks 316 and 322 of the client computer 101 illustrated in FIG. 4 are implemented by a not-illustrated CPU reading and executing programs stored in a not-illustrated storage device of the client computer 101.

The OS 321 represents basic software of the image processing controller 102. As described above, the OS 321 includes the power source control function 310. The OS 321 further includes a timer unit 314 which implements a timer function.

A print server application 301 is application software running on the OS 321, executed by the CPU 201. The print server application 301 includes a job interpretation unit 311, a job control unit 312, and an image forming processing unit 313, and executes various types of predetermined processing including image processing.

The job interpretation unit 311 is an editing unit that performs typesetting edit processing for editing image data of each page into a binding typesetting format based on instructions from the client computer 101. The job control unit 312 is a control unit that controls print jobs based on instructions from the client computer 101. Specifically, the job control unit 312 receives print data and instructions of the print data from the client computer 101, and performs print order control of print jobs of the print data. The image forming processing unit 313 is a processing unit that performs conversion processing for converting a PDL into raster images (image data) printable by the image forming apparatus 103 when the job interpretation unit 311 performs typesetting or when the job control unit 313 performs actual image forming processing.

The image processing controller 102 further includes a job management application 315. The job management application 315 is an application for managing and displaying the state of a job being processed in the print server application 301, the state of the image forming apparatus 103, and resources (sheet feed stages and the remaining amount of toner). Such information is periodically updated. The user can check the state of the image forming system 100 (FIG. 1) via the operation unit 219. Another job management application 316 can be installed in the client computer 101, whereby the user can recognize the state of the image forming system 100 (FIG. 1) from a location remote from the image processing controller 102.

Power State Transition of Image Processing Controller

FIG. 5 is a state transition diagram illustrating power state transition of the image processing controller 102.

The image processing controller 102 according to the present exemplary embodiment shifts to any of the following power states: the power off state 401, the standby state 402, a job execution state 403, and the power saving state 404. While the present exemplary embodiment deals with the foregoing four states, an exemplary embodiment is not limited thereto, and the image processing controller 102 may enter other power states. For example, the image processing controller 102 may enter a not-illustrated suspend state or a not-illustrated hibernation state.

The suspend state refers to a state in which the image processing controller 102 can return to the standby state 402 at high speed. In the suspend state, the memory 202 continues being powered on. The image processing controller 102 returns to the standby state 402 by using the state of the image processing controller 102 stored in the memory 202.

The hibernation state refers to a state in which the image processing controller 102 can return to the standby state 402 at high speed, as well. In the hibernation state, a power state is similar to the power off state 401, where the power supply to the respective units of the image processing controller 102 is stopped. A difference from the power off state 401 lies in that the state of the image processing controller 102 is stored in the HDD 203 before the image processing controller 102 shifts to the hibernation state. When returning from the hibernation state to the standby state 402, the image processing controller 102 returns at high speed based on the information stored in the HDD 203.

The power states of the image processing controller 102 sorted in the descending order of power consumption are: the job execution state 403>the standby state 402>the power saving state 404>the power off state 401.

The power off state 401 is a state where the power supply to all the components of the image processing controller 102 is stopped. In the power off state 401, if the user presses the push switch 253, the image processing controller 102 shifts to the standby state 402.

The standby state 402 is a state where the image processing controller 102 waits for execution of a job, and power is supplied to all the components of the image processing controller 102. It is not necessary that power is supplied to all the components of the image processing controller 102 in the standby state 402. The image processing controller 102 may be configured so that power is supplied to indispensable components while power is not supplied to the other components (for example, the operation unit 105).

In the standby state 402, if the image processing controller 102 receives a job from the client computer 101, the image processing controller 102 shifts to the job execution state 403. If a sleep shift factor occurs in the standby state 402, the image processing controller 102 shifts to the power saving state 404.

Examples of the sleep shift factor include the following (1) to (3).
(1) The user presses a sleep shift button (not illustrated).
(2) A predetermined time elapses in the standby state 402 without execution of a print job, a scan job, or the like.
(3) A predetermined time elapses without the job management application 315 of the image processing controller 102 being accessed from the client computer 101.

In the standby state 402, if the user turns off the push switch 253, shutdown processing is performed and the image processing controller 102 shifts to the power off state 401. The shutdown processing refers to processing for terminating the OS and the applications to shut down the image processing controller 102.

The job execution state 403 is a state where the image processing controller 102 is executing a job, and power is supplied to all the components of the image processing controller 102. Note that even in the job execution state 403, it is not necessary that power is supplied to all the components of the image processing controller 102. The image processing controller 102 may be configured so that power is supplied to indispensable components while power is not supplied to the other components (for example, the operation unit 105). Alternatively, the image processing controller 102 may be configured so that power is not supplied to units that are not used to execute the job. Specifically, if the image processing controller 102 is executing a print job for forming an image on a sheet, the power supply to the operation unit 105 which is not used to execute the print job may be stopped. If the job ends in the job execution state 403, the image processing controller 102 shifts to the standby state 402.

The power saving state 404 is a state where the image processing controller 102 waits while saving power, and power is supplied to a part of the components of the image processing controller 102, including the network I/Fs 204 and 205. In the power saving state 404, if a sleep return factor such as reception of a power saving state return notification occurs, the image processing controller 102 shifts to the standby state 402.

Examples of the sleep return factor include the following (1) to (3).
(1) The user presses a sleep return button (not illustrated).
(2) A job is received from the client computer 101.
(3) The image processing controller 102 is accessed from the job management application 316 of the client computer 101.

The network I/F 205 can respond to a simple packet transmitted via the control cable 111 while remaining in the power saving state 404. The network I/F 204 can respond to a simple packet transmitted via the network 113 while remaining in the power saving state 404. Such functions will hereinafter be referred to as a proxy response. Examples of the simple packets include packets for an Address Resolution Protocol (ARP) request, Simple Network Management Protocol (SNMP) state acquisition, and Internet Control Message Protocol (ICMP) neighbor discovery.

Power Saving Shift Condition Setting Screen

Figure 8:
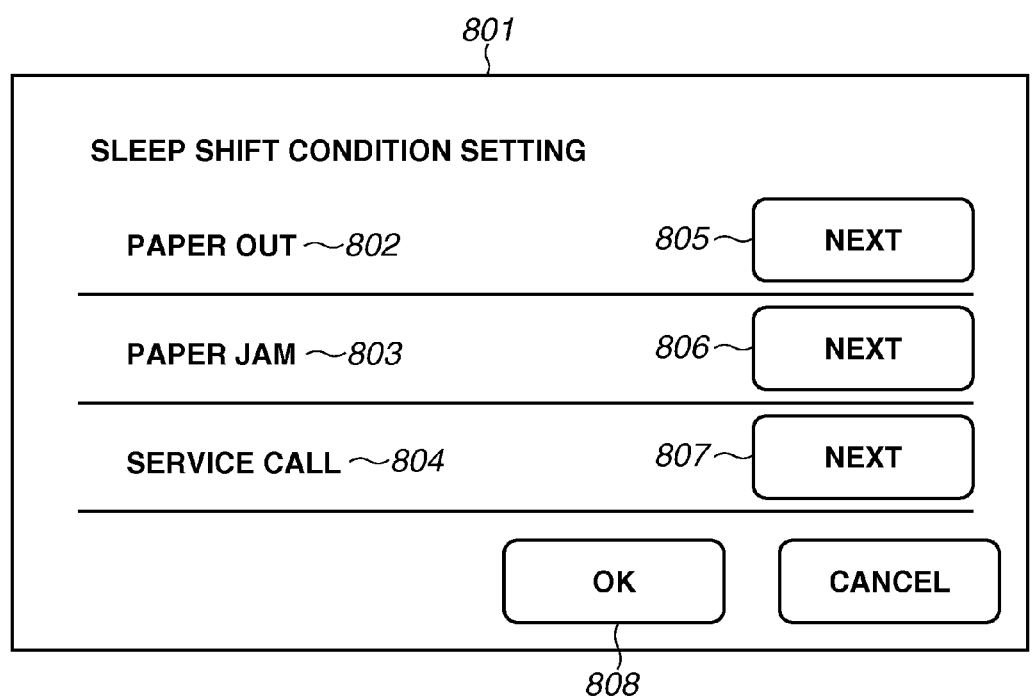
FIG. 8 illustrates an example of a setting screen of a power saving shift condition of the image processing controller.
Figure 9:
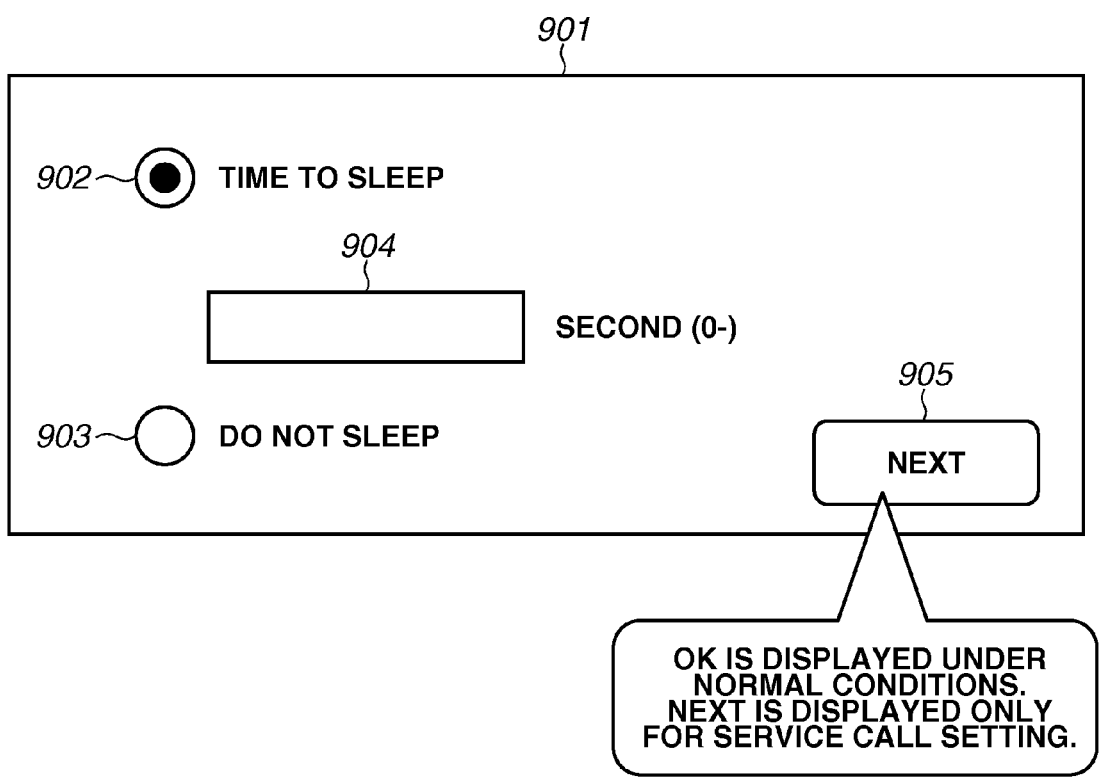
FIG. 9 illustrates an example of a setting screen of a power saving shift condition of the image processing controller.
Figure 10:
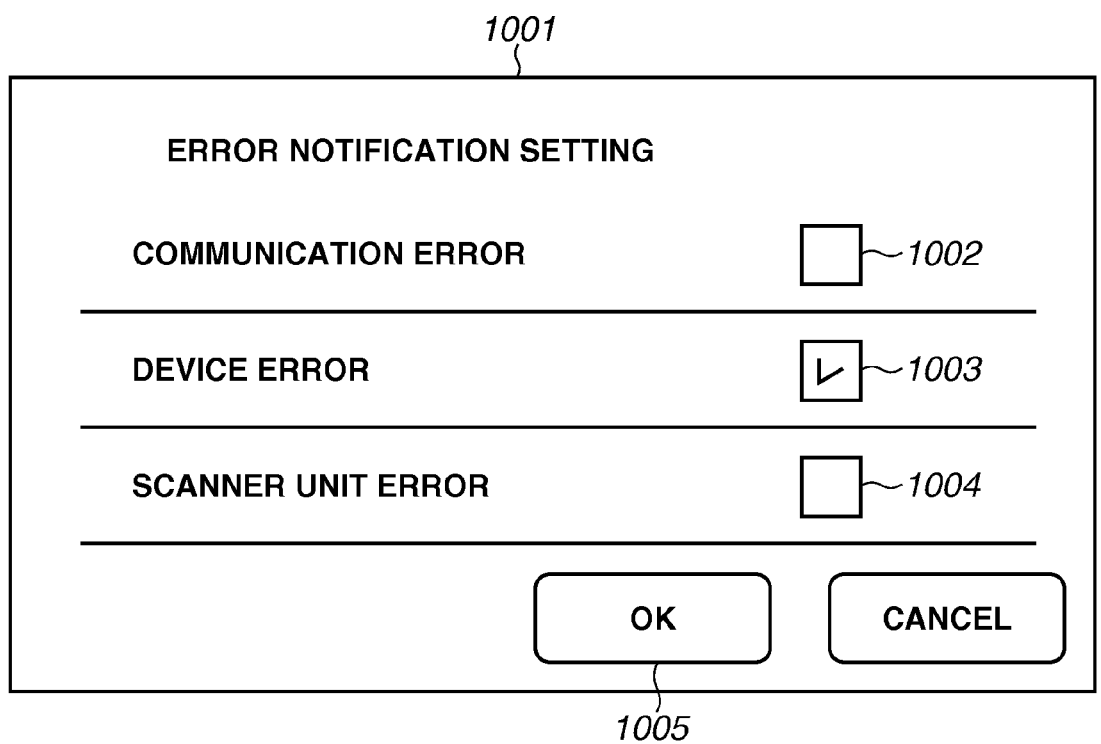
FIG. 10 illustrates an example of a setting screen of a power saving shift condition of the image processing controller.

FIGS. 8, 9, and 10 are diagrams illustrating examples of setting screens 801, 901, and 1001 for setting a power saving shift condition of the image processing controller 102. The setting screens 801, 901, and 1001 are displayed on a display unit of the operation unit 219 by control of the CPU 201.

Error information of which the image forming apparatus 103 notifies the image processing controller 102 when interrupting a job is broadly classified into two types: (1) operator calls and (2) service calls.
(1) An operator call notifies information about an error that can be repaired by an operator who uses the image forming apparatus 103. Examples of such an error include a paper out and a paper jam. For recovery, the image forming apparatus 103 does not need to be powered off and on. In other words, an operator call corresponds to an error type in which the image forming apparatus 103 does not need to be once powered off and powered on again for recovery.
(2) A service call notifies information about an error that occurs during printing and with which normal printing is unable to be performed unless the system power source of the image forming apparatus 103 is turned off and on. In other words, a service call corresponds to an error type in which the image forming apparatus 103 needs to be once powered off and powered on again for recovery.

The user can set the power saving shift condition of the image processing controller 102 when error information is notified from the image forming apparatus 103, by making settings on the setting screens 801, 901, and 1001 illustrated in FIGS. 8, 9, and 10.

On the setting screens 801 and 901 of FIGS. 8 and 9, the user can set whether the image processing controller 102 enters the power saving state 404 when en error indicated by error information 802, 803, or 804 occurs.

On the setting screen 801 of FIG. 8, the user selects the information 802, 803, or 804 to make a setting thereof, by using buttons 805, 806, and 807. The user can set whether the image processing controller 102 enters the power saving state 404 when the selected error information is notified, by using radio buttons 902 and 903 on the setting screen 901 of FIG. 9.

If the button 805, 806, or 807 is pressed, the CPU 201 causes the display of the operation unit 219 to transition to the screen illustrated in FIG. 9.

Aside from a paper out 802 and a paper jam 803, operator calls may include ones for other errors. For example, a toner out and a stapler out may be included.

Paper jams may be classified into a plurality of types depending on paper jam positions (positions where the paper jams occur), and the image processing controller 102 may be configured so that the user can set for each of these types whether the image processing controller 102 enters the power saving state 404. For example, paper jams may be classified into ones occurring near a fixing device and others. The user may make a setting so that the image processing controller 102 shifts to the power saving state 404 in the case of a paper jam near the fixing device (because it is more difficult to remove paper than in other locations) while the image processing controller 102 does not shift to the power saving state 404 in the case of other paper jams.

On the setting screen 901 of FIG. 9, if the button 902, which is a setting for shifting the image processing controller 102 to the power saving state 404, is selected, a shift time 904 to shift to the power saving state 404 can be set for each error selected in FIG. 8. Hereinafter, in the setting screen 901 and the flowcharts to be described below, the "power saving state" 404 may also be referred to as "sleep." The CPU 201 uses the timer unit 314 of the OS 321 to measure the shift time 904 set above, and the image processing controller 102 shifts from the standby state 402 to the power saving state 404 after a lapse of the shift time 904. Details of such an operation are illustrated in steps S616, S617, and S618 of FIG. 6 to be described below.

If a button 905 is pressed on the setting screen 901 of FIG. 9, the CPU 201 determines the settings on the setting screen 901 and performs control to return the display to the setting screen 801 of FIG. 8. Only if a service call 804 (the next button 807) is selected on the setting screen 801 of FIG. 8, the CPU 201 performs control to display the setting screen 1001 of FIG. 10 upon the button 905 being pressed.

On the setting screen 1001 of FIG. 10, the user can set the type of a service call of which the image processing controller 102 notifies the client computer 101 when the service call 804 occur. If an error of which check box 1002, 1003, or 1004 is checked on the setting screen 1001 occurs, the image processing controller 102 notifies the user of the client computer 101 of the error. The types of the service calls are not limited to a communication error, a device error, and a scanner unit error respectively indicated by the check boxes 1002, 1003, and 1004, and may include other types of service calls.

If a button 1005 is pressed on the setting screen 1001 of FIG. 10, the CPU 201 determines the setting on the setting screen 1001 and performs control to return the display to the setting screen 801 of FIG. 8. If a button 808 is pressed on the setting screen 801 of FIG. 8, the CPU 201 determines the settings on the screens of FIGS. 8, 9, and 10, and stores these settings into the HDD 203 as the power saving shift condition (sleep shift condition) of the image processing controller 102.

Figure 6:
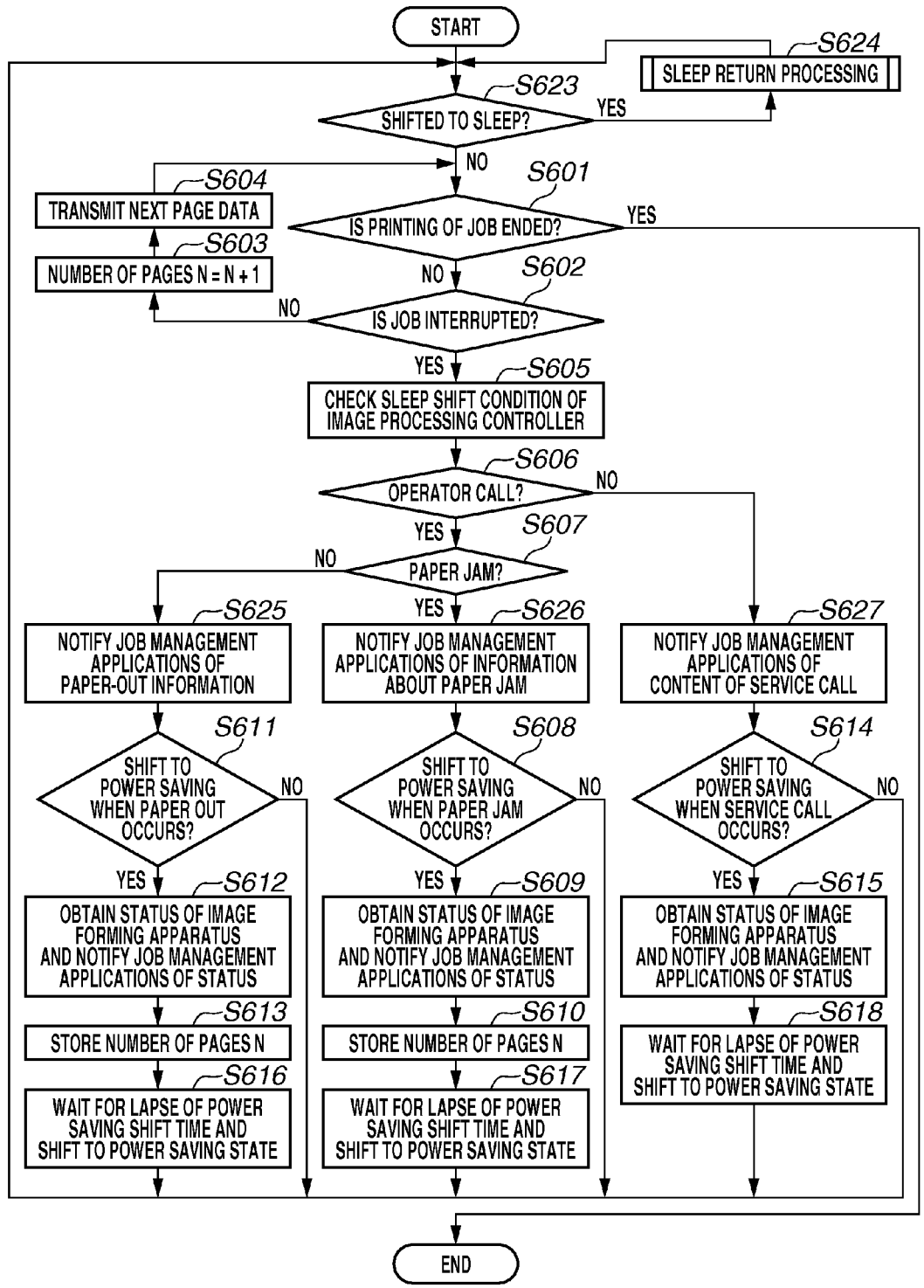
FIG. 6 is a flowchart illustrating a power saving state shift operation of the image processing controller according to a first exemplary embodiment.

Description of Operation when Image Processing Controller Shifts to Power Saving State FIG. 6 is a flowchart illustrating an example of a power saving state shift operation by the image processing controller 102 according to the first exemplary embodiment. The processing in the flowchart illustrated in FIG. 6 is implemented by the CPU 201 executing a program loaded from the HDD 203 into the memory 202.

After the image forming apparatus 103 starts executing a job input from the image processing controller 102 to the image forming apparatus 103, the CPU 201 of the image processing controller 102 starts the processing of the present flowchart. At this time, the image processing controller 102 is in the job execution state 403 (not in the power saving state 404). In step S623, the CPU 201 therefore determines that the image processing controller 102 has not shifted to sleep (NO in step S623), and advances the processing to step S601.

In step S601, the CPU 201 receives a notification from the image forming apparatus 103, and determines whether printing of the job is ended by the image forming apparatus 103, based on the notification. When printing a job, the image forming apparatus 103 issues a page print end notification to the image processing controller 102 at the end of printing of each page. When ending a job and when interrupting a job, the image forming apparatus 103 also transmits respective notifications to the image processing controller 102. The interruption notification includes information indicating error content corresponding to the cause of the interruption.

If the CPU 201 determines that the printing of the job is not ended (NO in step S601), then in step S602, the CPU 201 determines whether the job is interrupted, based on the notification received from the image forming apparatus 103. If the notification is a page print end notification, the CPU 201 determines that the job is not interrupted (NO in step S602). In step S603, the CPU 201 increases the number of pages N by one. In step S604, the CPU 201 transmits next page data to the image forming apparatus 103, and advances the processing to step S601. The number of pages N is initialized to "0" at the start of the job, and incremented each time the page print end notification is received. That is, the number of pages N also corresponds to the number of pages of image data having been input to the image forming apparatus 103.

On the other hand, if the notification is a job interruption notification, the CPU 201 determines that the job is interrupted (YES in step S602), and advances the processing to step S605.

In step S605, the CPU 201 loads, from the HDD 203 into the memory 202, the power saving shift condition (sleep shift condition) of the image processing controller 102 set by the user via the operation unit 219 of the image processing controller 102, and checks the power saving shift condition.

Next, in step S606, the CPU 201 determines whether the occurred error is one corresponding to an "operator call" or one corresponding to a "service call," based on the job interruption notification. As described above, an error corresponding to an operator call refers to an error (e.g., a paper out and a paper jam) that can be repaired by the operator who uses the image forming apparatus 103 for printing. An error corresponding to a service call refers to an error that occurs during printing and with which normal printing is unable to be performed unless the system power source of the image forming apparatus 103 is turned off and on.

In Case of Error Resulting from Paper Jam

If the CPU 201 determines that the occurred error is one corresponding to an "operator call" (YES in step S606), then in step S607, the CPU 201 determines whether the content of the error indicates that the error results from a "paper jam" or a "paper out."

If the CPU 201 determines that the content of the error indicates that the error results from a "paper jam" (YES in step S607), then in step S626, the CPU 201 notifies the job management applications 315 and 316 of information about the paper jam.

In step S608, the CPU 201 checks the power saving shift condition of the image processing controller 102 stored in the memory 202 in the foregoing step S605, and determines whether the image processing controller 102 is instructed to shift to the power saving state 404 when a paper jam occurs. If the CPU 201 determines that the image processing controller 102 is instructed to shift to the power saving state 404 when a paper jam occurs (YES in step S608), the CPU 201 advances the processing to step S609.

In step S609, the CPU 201 obtains a status of the image forming apparatus 103 from the image forming apparatus 103 and notifies the job management applications 315 and 316 of the obtained status of the image forming apparatus 103. In step S610, the CPU 201 stores the number of pages N of image data having been transmitted to the image forming apparatus 103 into the memory 202 or the HDD 203 in preparation for when returning from the power saving state 404.

Figure 7:
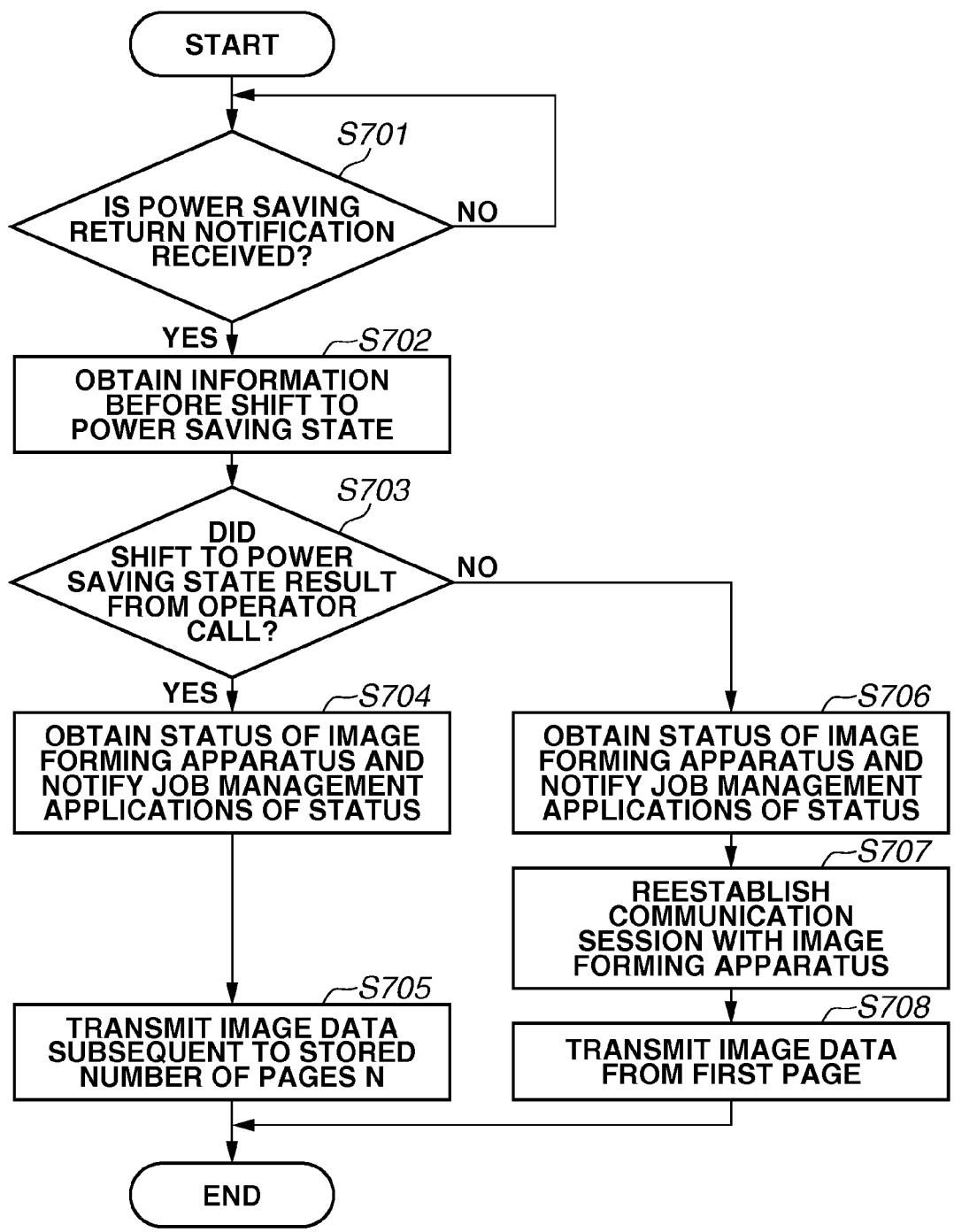
FIG. 7 is a flowchart illustrating sleep return processing of the image processing controller.

In step S617, the CPU 201 waits for a lapse of the power saving shift time (the shift time 904 set in FIG. 9) included in the power saving shift condition, and shifts the image processing controller 102 to the power saving state 404. If the image processing controller 102 shifts to the power saving state 404 (YES in step S623), in step S624, the network I/F 205 performs sleep return processing. Details of the sleep return processing in step S624 are illustrated in FIG. 7 to be described below.

On the other hand, in the foregoing step S608, if the CPU 201 determines that the image processing controller 102 is not instructed to shift to the power saving state 404 when a paper jam occurs (NO in step S608), the CPU 201 advances the processing to step S623 without shifting the image processing controller 102 to sleep. Then, since the image processing controller 102 has not shifted to sleep (NO in step S623), the CPU 201 advances the processing to step S601.

In Case of Error Resulting from Paper Out

In step S607, if the CPU 201 determines the content of the occurred error indicates that the error results from a "paper out" (NO in step S607), the CPU 201 advances the processing to step S625.

In step S625, the CPU 201 notifies the job management application 315 and 316 of paper-out information.

Next, in step S611, the CPU 201 checks the power saving shift condition of the image processing controller 102 stored in the memory 202 in the foregoing step S605, and determines whether the image processing controller 102 is instructed to shift to the power saving state 404 when a paper out occurs. If the CPU 201 determines that the image processing controller 102 is instructed to shift to the power saving state 404 when a paper out occurs (YES in step S611), the CPU 201 advances the processing to step S612.

In step S612, the CPU 201 obtains the status of the image forming apparatus 103 from the image forming apparatus 103 and notifies the job management applications 315 and 316 of the obtained status of the image forming apparatus 103. In step S613, the CPU 201 stores the number of pages N of image data having been transmitted to the image forming apparatus 103 into the memory 202 or the HDD 203 in preparation for when returning from the power saving state 404.

Then, in step S616, the CPU 201 waits for a lapse of the power saving shift time included in the power saving shift condition, and shifts the image processing controller 102 to the power saving state 404. If the image processing controller 102 shifts to the power saving state 404 (YES in step S623), in step S624, the network I/F 205 performs the sleep return processing.

On the other hand, in the foregoing step S611, if the CPU 201 determines that the image processing controller 102 is not instructed to shift to the power saving state 404 when a paper out occurs (NO in step S611), the CPU 201 advances the processing to step S623 without shifting the image processing controller 102 to sleep. Then, since the image processing controller 102 has not shifted to sleep (NO in step S623), the CPU 201 advances the processing to step S601.

In Case of Error Resulting from Service Call

If the CPU 201 determines that the occurred error is one corresponding to a "service call" (NO in step S606), the CPU 201 advances the processing to step S627. In step S627, the CPU 201 examines the content of the service call and which part of the image forming apparatus 103 the error corresponding to the service call results from. The CPU 201 further checks the power saving shift condition of the image processing controller 102 stored in the memory 202 in the foregoing step S605, and determines whether the examined content of the service call is one checked to be notified in the error notification setting illustrated in FIG. 10. If the content of the service call is a checked one, the CPU 201 notifies the job management applications 315 and 316 of the content of the service call. On the other hand, if the content of the service call is not a checked one, the CPU 201 does not notify the job management applications 315 and 316 of the content of the service call.

In step S614, the CPU 201 determines whether the image processing controller 102 is instructed to shift to the power saving state 404 when a service call occurs. If the CPU 201 determines that the image processing controller 102 is instructed to shift to the power saving state 404 when a service call occurs (YES in step S614), the CPU 201 advances the processing to step S615.

In step S615, the CPU 201 obtains the status of the image forming apparatus 103 from the image forming apparatus 103 and notifies the job management applications 315 and 316 of the obtained status of the image forming apparatus 103. If the error information notified from the image forming apparatus 103 indicates that the error results from a service call, the image forming apparatus 103 needs to be powered off and on. The CPU 201 therefore does not store the number of pages N of the image data transmitted from the image processing controller 102 into the HDD 203.

Next, in step S618, the CPU 201 waits for a lapse of the power saving shift time included in the power saving shift condition, and the image processing controller 102 shifts to the power saving state 404. If the image processing controller 102 shifts to the power saving state 404 (YES in step S623), in step S624, the network I/F 205 performs the sleep return processing.

On the other hand, in the foregoing step S614, if the CPU 201 determines that the image processing controller 102 is not instructed to shift to the power saving state 404 when a service call occurs (NO in step S614), the CPU 201 does not shift the image processing controller 102 to sleep. In such a case, the CPU 201 advances the processing to step S623 without shifting the image processing controller 102 to sleep. Then, since the image processing controller 102 has not shifted to sleep (NO in step S623), the CPU 201 advances the processing to step S601.

Although not illustrated in the flowchart, if the CPU 201 shifts the image processing controller 102 to the power saving state 404 (YES in step S608, S611, or S614), the CPU 201 stores into the HDD 203 information about the image processing controller 102 before the shift to the power saving state 404, before shifting thereto. The information before the shift to the power saving state 404 refers to which type of the content of the error causes the image processing controller 102 to shift to the power saving state 404. In other words, the information includes the error content from which the shift to the power saving state 404 results. Such information is read in step S702 of FIG. 7 to be described below.

In the foregoing step S601, if the CPU 201 determines that the printing of the job input to the image forming apparatus 103 has ended by the image forming apparatus 103 (YES in step S601), the CPU 201 ends the processing of the present flowchart.

When Power Saving Return Notification is Received on Image Processing Controller Side The operation of the image processing controller 102 when a power saving return notification is detected on the image processing controller 102 side will be described below with reference to FIG. 7.

FIG. 7 is a flowchart illustrating an example of the sleep return processing of the image processing controller 102 (step S624 of FIG. 6). The processing in the flowchart illustrated in FIG. 7 is implemented by the CPU 201 executing a program loaded from the HDD 203 into the memory 202.

If the image processing controller 102 shifts to the power saving state 404, in step S701, the CPU 201 monitors reception of a power saving return notification (an instruction for returning the image processing controller 102 from the power saving state 404) transmitted from the image forming apparatus 103 via the network I/F 205. If the CPU 201 determines that a power saving return notification transmitted from the image forming apparatus 103 is received (YES in step S701), then in a not-illustrated step, the CPU 201 performs return processing from the power saving state 404. Specifically, the CPU 201 controls the FET 255 to be turned on. As a result, the power supply to the respective units (the HDD 203, the video I/F 206, and the operation unit 219) connected to the second power source unit 252 is resumed, and the image processing controller 102 returns to the standby state 402 (FIG. 4).

If the image processing controller 102 returns to the standby state 402, in step S702, the CPU 201 obtains the information before the shift to the power saving state 404, stored in the HDD 203. Then, in step S703, the CPU 201 determines which type of the content of the error causes the image processing controller 102 to shift to the power saving state 404 at the time of the shift thereto, based on the information before the shift to the power saving state 404, obtained in the foregoing step S702.

If the CPU 201 determines that the shift to the power saving state 404 results from an "operator call" (YES in step S703), the CPU 201 advances the processing to step S704. In step S704, the CPU 201 obtains the status of the image forming apparatus 103 and notifies the job management application 315 and the job management application 316 on the client computer 101 of the status.

In step S705, the CPU 201 transmits image data subsequent to the number of pages N stored in the HDD 203 (stored in step S610 or S613 of FIG. 6) to the image forming apparatus 103 via the video I/F 206. The CPU 201 then ends the processing of the present flowchart and advances the processing to step S623 of FIG. 6.

On the other hand, if the CPU 201 determines that the shift to the power saving state 404 results from a "service call" (NO in step S703), the CPU 201 advances the processing to step S706. In step S706, the CPU 201 obtains the status of the image forming apparatus 103 and notifies the job management application 315 and the job management application 316 on the client computer 101 of the status.

In step S707, the CPU 201 checks that the image forming apparatus 103 is powered off and on, and then reestablishes a communication session with the image forming apparatus 103 via the network I/F 205. When the communication session with the image forming apparatus 103 is restored, then in step S708, the CPU 201 issues an instruction for transmitting the image data to the image forming apparatus 103 via the video I/F 206 from the first page. The CPU 201 then ends the processing of the present flowchart and advances the processing to step S623 of FIG. 6.

Effect of First Exemplary Embodiment

In the first exemplary embodiment, the image processing controller 102 shifts to the power saving state 404 according to the error information notified from the image forming apparatus 103. As a result, if an error occurs in the image forming apparatus 103, the image processing controller 102 can be prevented from remaining in the standby state 402 and unnecessarily consuming power. The power saving of the image processing controller 102 can thus be achieved.

In the first exemplary embodiment, as described in FIG. 5, the image processing controller 102 shifts from the power saving state 404 to the standby state 402 when accessed from the job management application 316 of the client computer 101.

In a second exemplary embodiment, a description will be given of a configuration in which the power saving state 404 of the image processing controller 102 is maintained by taking measures against access from the job management application 316. The second exemplary embodiment has almost the same basic configuration as that of the image forming system 100 of the first exemplary embodiment. Only differences will be described below.

In the first exemplary embodiment, when the image processing controller 102 shifts to the power saving state 404, power saving state shift processing is performed based on the reception of the error information notified from the image forming apparatus 103. On the other hand, in the second exemplary embodiment, the image processing controller 102 receiving the error information does not shift to the power saving state 404 if accessed from the client computer 101. A description will be given below with reference to FIG. 11.

FIG. 11 is a flowchart illustrating an example of the power saving state shift operation by the image processing controller 102 according to the second exemplary embodiment. Similar steps to those of FIG. 6 are designated by the same step numbers. The processing in the flowchart illustrated in FIG. 11 is implemented by the CPU 201 executing a program loaded from the HDD 203 into the memory 202.

In the second exemplary embodiment, if the CPU 201 receives a job interruption notification (YES in step S602), then in step S605, the CPU 201 checks the power saving shift condition. In step S622, the CPU 201 then checks whether the image processing controller 102 has been accessed from the client computer 101 within a predetermined time. The image processing controller 102 stores a history of access from the client computer 101 in the HDD 203 or the memory 202.

If the CPU 201 determines that the image processing controller 102 is accessed from the client computer 101 within the predetermined time (YES in step S622), the CPU 201 advances the processing to step S623 without shifting the image processing controller 102 to the power saving state 404. On the other hand, if the CPU 201 determines that the image processing controller 102 is not accessed from the client computer 101 within the predetermined time (NO in step S622), the CPU 201 advances the processing to step S606.

If the image processing controller 102 is instructed to shift to the power saving state 404 (YES in step S608, S611, or S614), then in step S619, S620, or S621, the CPU 201 notifies the job management application 316 on the client computer 101 of a display maintenance notification. The client computer 101 to be notified of the display maintenance notification is the one listed in the foregoing access history.

The display maintenance notification is a notification for instructing the job management application 316 to maintain the display thereof without connecting to (accessing) the image processing controller 102. Receiving the display maintenance notification, the job management application 316 on the client computer 101 maintains the display of the user interface (UI) without accessing the image processing controller 102. This can prevent the image processing controller 102 from shifting from the power saving state 404 to the standby state 402 due to access from the job management application 316. After the display maintenance notification, the job management application 316 resumes accessing the image processing controller 102 if, for example, the image processing controller 102 returns from the power saving state 404 and the job manage application 316 receives a state notification from the job management application 315.

Effect of Second Exemplary Embodiment

In the second exemplary embodiment, the image processing controller 102 does not shift to the power saving state 404 if accessed from the job management application 316 which attempts to obtain the error information notified from the image forming apparatus 103. When shifting to the power saving state 404, the image processing controller 102 notifies the job management application 316 of the display maintenance notification. This prevents the image processing controller 102 from returning from the power saving state 404 to the standby state 402 due to access from the job management application 316. With such a configuration, when an error occurs in the image forming apparatus 103, the image processing controller 102 can maintain the power saving state 404 without unnecessarily consuming power. The power saving of the image processing controller 102 can thus be achieved.

That "the image processing controller 102 is accessed from the job management application 316 of the client computer 101" may be excluded from the sleep return factors. In such a case, the CPU 201 is configured to store the status of the image forming apparatus 103 into a memory in the network I/F 204 when the image processing controller 102 shifts to the power saving state 404 (YES in step S608, S611, or S614). The network I/F 204 is further configured to transmit the stored status of the image forming apparatus 103 to the job management application 316 by the proxy response function if the image processing controller 102 is accessed from the job management application 316 in the power saving state 404.

Such a proxy response function can prevent the image processing controller 102 from shifting from the power saving state 404 to the standby state 402 due to access from the job management application 316. This provides a similar effect to that of the second exemplary embodiment.

The configurations and contents of the various types of data described above are not limited to the foregoing. It will be understood that various configurations and contents may be used according to intended applications or purposes.

While several exemplary embodiments have been described above, additional exemplary embodiments may be implemented, for example, as a system, an apparatus, a method, a program, and/or a recording medium. Specifically, an exemplary embodiment may be applied to a system including a plurality of devices or an apparatus including a single device.

Configurations combining the foregoing exemplary embodiments are all intended to be embraced within the scope of the present disclosure.

The present invention is not limited to the foregoing exemplary embodiments. Various modifications (including organic combinations of the exemplary embodiments) may be made based on the general idea of the present disclosure, and such modifications are not intended to be excluded from the scope of the present disclosure. In other words, combinations of the foregoing exemplary embodiments and their modifications are all intended to be embraced within the present disclosure.

According to an exemplary embodiment, the power saving of an image processing controller connected to an image forming apparatus can be achieved.

Additional embodiments of the present disclosure can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-249024 filed Dec. 2, 2013, which is hereby incorporated by reference herein in its entirety.

What is claimed is:

1. An image processing apparatus configured to be communicably connected via a network to an image forming apparatus for printing an image on a sheet and to an information processing apparatus, the image processing apparatus comprising:
a job receiving unit configured to receive a print job from the information processing apparatus;
a generation unit configured to generate image data based on the print job received by the job receiving unit;
a transmitting unit configured to transmit the image data generated by the generation unit to the image forming apparatus via the network;
a first reception unit configured to receive, from the image forming apparatus via the network, a print completion notice indicating that printing of the image data transmitted by the transmitting unit is completed;

a second receiving unit configured to receive, from the image forming apparatus via the network interruptive information indicating that the image forming apparatus has interrupted the printing of the image data because of an error occurred in the image forming apparatus; and a control unit configured to shift a power state of the image processing apparatus from a standby power state to a power saving state, in which consumed power is less than the standby power state, based on receiving of the interruptive information from the image forming apparatus.

2. The image processing apparatus according to claim 1, further comprising:

a determination unit configured to determine, based on an error content corresponding to the error, whether to shift the power state of the image processing apparatus from the standby power state to the power saving state, wherein the control unit shifts the power state of the image processing apparatus from the standby power state to the power saving state in a case where the second receiving unit receives the interruptive information from the image forming apparatus and the determination unit determines that the power state of the image processing apparatus is shifted from the standby power state to the power saving state.

3. The image processing apparatus according to claim 2, further comprising:

a first setting unit configured to set an error cause which shifts the power state of the image processing apparatus from the standby power state to the power saving state, wherein, in a case where the error which caused the interruption of printing corresponds to the error cause set by the first setting unit, the control unit shifts the power state of the image processing apparatus from the standby power state to the power saving state.

4. The image processing apparatus according to claim 3, wherein the first setting unit sets, for each error cause set to shift the power state of the image processing apparatus from the standby power state to the power saving state, a shift time required to shift the power state of the image processing apparatus from the standby power state to the power saving state, and wherein, in a case where the second receiving unit receives the interruptive information from the image forming apparatus and the determination unit determines that the power state of the image processing apparatus is shifted from the standby power state to the power saving state, the control unit shifts the power state of the image processing apparatus from the standby power state to the power saving state after a lapse of a shift time according to the error cause.

5. The image processing apparatus according to claim 3, wherein, in a case where the first setting unit sets a paper jam as an error cause which shifts the power state of the image processing apparatus from the standby power state to the power saving state, the first setting unit sets whether to shift the power state of the image processing apparatus from the standby power state to the power saving state for each position along a paper path where a paper jam occurs.

6. The image processing apparatus according to claim 1, wherein, in a case where the control unit shifts the power state of the image processing apparatus to the standby power state, and the error content corresponds to a first type of error cause in which the image forming apparatus does not need to be powered off and on for recovery, the control unit stores a number of pages of image data having been input to the image forming apparatus and the error content into a storage unit, wherein the image processing apparatus further comprises a return unit configured to perform control, according to a return instruction from the image forming apparatus, to cause the power state of the image processing apparatus to return from the standby power state and wherein, in a case where an error content stored in the storage unit corresponds to the first type of error cause, the return unit performs control to resume inputting the image data to the image forming apparatus based on a number of pages stored in the storage unit.

7. The image processing apparatus according to claim 6, wherein, in a case where the error content corresponds to the first type of error cause, the control unit provides the error content external to the image processing apparatus.

8. The image processing apparatus according to claim 6, wherein, in a case where the control unit shifts the power state of the image processing apparatus to the standby power state, and the error content corresponds to a second type of error cause in which the image forming apparatus needs to be powered off and on for recovery, the control unit stores the error content into the storage unit, and wherein, in a case where an error content stored in the storage unit corresponds to the second type of error cause, the return unit performs control to resume inputting the image data to the image forming apparatus from a first page.

9. The image processing apparatus according to claim 8, further comprising:

a second setting unit configured to set whether an error cause corresponding to the second type of error cause is provided external to the image processing apparatus, wherein, in a case where the error content corresponds to the second type of error cause, and the error content corresponds to the error cause set by the second setting unit to be provided external to the image processing apparatus, the control unit provides the error content external to the image processing apparatus.

10. The image processing apparatus according to claim 1, wherein, even if the image forming apparatus interrupts the printing, in a case where an information processing apparatus, which obtains a state of the image forming apparatus from the image processing apparatus and displays the state, connects to the image processing apparatus, the control unit does not shift the power state of the image processing apparatus from the standby power state to the power saving state.

11. The image processing apparatus according to claim 10, wherein, in a case where the control unit shifts the power state of the image processing apparatus from the standby power state to the power saving state, the control unit issues, to the information processing apparatus, a notification for maintaining display without connecting to the image processing apparatus.

12. The image processing apparatus according to claim 1, wherein the network between the image processing apparatus and the image forming apparatus is a network based on the Ethernet.

13. The image processing apparatus according to claim 1, wherein the image processing apparatus and the image forming apparatus are connected via a video cable for transmitting the image data and a control cable for transmitting a control command for controlling the image forming apparatus which performs printing based on the image data.

14. The image processing apparatus according to claim 1, wherein, in a case where, before the power state of the image processing apparatus is shifted to the power saving state, the transmitting unit has transmitted image data for one or more pages among a plurality of pages generated by the generation unit, the transmitting unit transmits image data of the other pages of the plurality of pages after the power state is returned from the power saving state.

15. The image processing apparatus according to claim 1, wherein the transmitting unit does not transmit the image data in the power saving state.

16. The image processing apparatus according to claim 15, wherein power supply to the transmitting unit is stopped in the power saving state.

17. The image processing apparatus according to claim 15, wherein the error includes a paper jam and a paper out.

18. A method for controlling an image processing apparatus configured to be communicably connected via a network to an image forming apparatus for printing an image on a sheet and to an information processing apparatus, the method comprising:

receiving, executed by a processor, a print job from the information processing apparatus;

generating, executed by a processor, image data based on the print job received;

transmitting, executed by a processor, the image data generated to the image forming apparatus via the network;

receiving, executed by a processor, from the image forming apparatus via the network, a print completion notice indicating that printing of the image data transmitted is complete;

receiving, executed by a processor, interruptive information from the image forming apparatus via the network, indicating that the image forming apparatus has interrupted printing of the image data because of an error occurred in the image forming apparatus; and shifting, executed by a processor, a power state of the image processing apparatus from a standby power state to a power saving state, in which consumed power is less than the standby power state, based on receiving of the print completion notice from the image forming apparatus or the receiving of the interruptive information from the image forming apparatus.

19. The method according to claim 18, further comprising:

determining, based on an error content corresponding to the error, whether to shift the power state of the image processing apparatus from the standby power state to the power saving state, wherein, in a case where the interruptive information is received from the image forming apparatus and it is determined, based on the error content, that the power state of the image processing apparatus is to be shifted from the standby power state to the power saving state, the power state of the image processing apparatus is shifted from the standby power state to the power saving state.

* * * * *